United States Patent
Mahmood et al.

[11] Patent Number: 5,853,857
[45] Date of Patent: Dec. 29, 1998

[54] WINDSHIELD FRAME

[75] Inventors: Mohammed Mahmood, Troy; Michael M. Shinedling, Lake Orion; Saad M. Abouzahr, Highland; Stuart A. Ehrhardt, Davisburg; Dennis G. Karolski, Rochester Hills, all of Mich.

[73] Assignees: The Budd Company, Troy; Chrysler Corporation, Auburn Hills, both of Mich.

[21] Appl. No.: 803,223

[22] Filed: Feb. 20, 1997

[51] Int. Cl.⁶ .............. B32B 1/00; B29L 47/00; B28B 5/00
[52] U.S. Cl. .............. 428/178; 428/122; 428/166; 428/58; 428/172; 428/188; 156/242; 156/244.22; 156/304.2; 264/241; 264/319
[58] Field of Search .................. 428/172, 167, 428/156, 178, 166, 122, 188, 58; 156/244.11, 244.22, 242, 292, 304.2; 264/241, 319; 296/96.21, 210

[56] References Cited

U.S. PATENT DOCUMENTS

| | | | |
|---|---|---|---|
| 3,093,845 | 6/1963 | Brock et al. | 9/1 |
| 3,121,924 | 2/1964 | Beisel | 20/56 |
| 3,158,395 | 11/1964 | Smith | 296/44 |
| 3,222,769 | 12/1965 | LePlae | 29/413 |
| 3,295,813 | 1/1967 | Tschursch | 248/291 |
| 3,526,426 | 9/1970 | Wessells | 296/28 |
| 3,829,153 | 8/1974 | Fussell, Jr. et al. | 296/90 |
| 3,843,982 | 10/1974 | Lane et al. | 296/89 R |
| 4,146,263 | 3/1979 | Watari | 296/84 R |
| 4,151,620 | 5/1979 | Heuzonter | 9/1.5 |
| 4,373,745 | 2/1983 | Matsuno | 296/70 |
| 4,606,571 | 8/1986 | Fujita | 296/78.1 |
| 4,612,149 | 9/1986 | Iseler et al. | 264/1.1 |
| 4,848,147 | 7/1989 | Bailey et al. | 73/204.17 |
| 4,855,097 | 8/1989 | Iseler et al. | 264/102 |
| 4,863,771 | 9/1989 | Freeman | 428/36.1 |
| 4,911,876 | 3/1990 | Freeman | 264/258 |
| 4,943,102 | 7/1990 | Hamamoto et al. | 296/96.1 |
| 5,000,990 | 3/1991 | Freeman | 428/36.1 |
| 5,076,632 | 12/1991 | Surratt | 296/96.21 |
| 5,130,071 | 7/1992 | Iseler et al. | 264/102 |
| 5,344,038 | 9/1994 | Freeman et al. | 220/453 |
| 5,618,593 | 4/1997 | Belser et al. | 428/31 |

*Primary Examiner*—Donald Loney
*Attorney, Agent, or Firm*—Harness, Dickey & Pierce, P.L.C.

[57] ABSTRACT

The present invention provides a windshield frame utilizing composite technology. More particularly, the windshield frame preferably comprises a fiber reinforced plastic molded upper frame section bonded with a structural grade adhesive to a fiber reinforced plastic molded lower frame section. According to the invention, steel reinforcements and tapping plates are bonded on or molded into the frame sections to stabilize the structure and provide hardware attachment points. Continuous carbon fibers may also be molded in the frame sections in critical high stress areas. The strength of the bonding between the frame sections is enhanced by a tongue and groove geometry along the interface. In addition, dowel pins and bushings are used to mechanically tie the frame sections together near body side attachment points. The frame sections also define a hollow section therebetween to maximize structural efficiency, provide a conduit for electrical wires and offer a platform for visors, mirrors, seals, and other hardware.

30 Claims, 3 Drawing Sheets

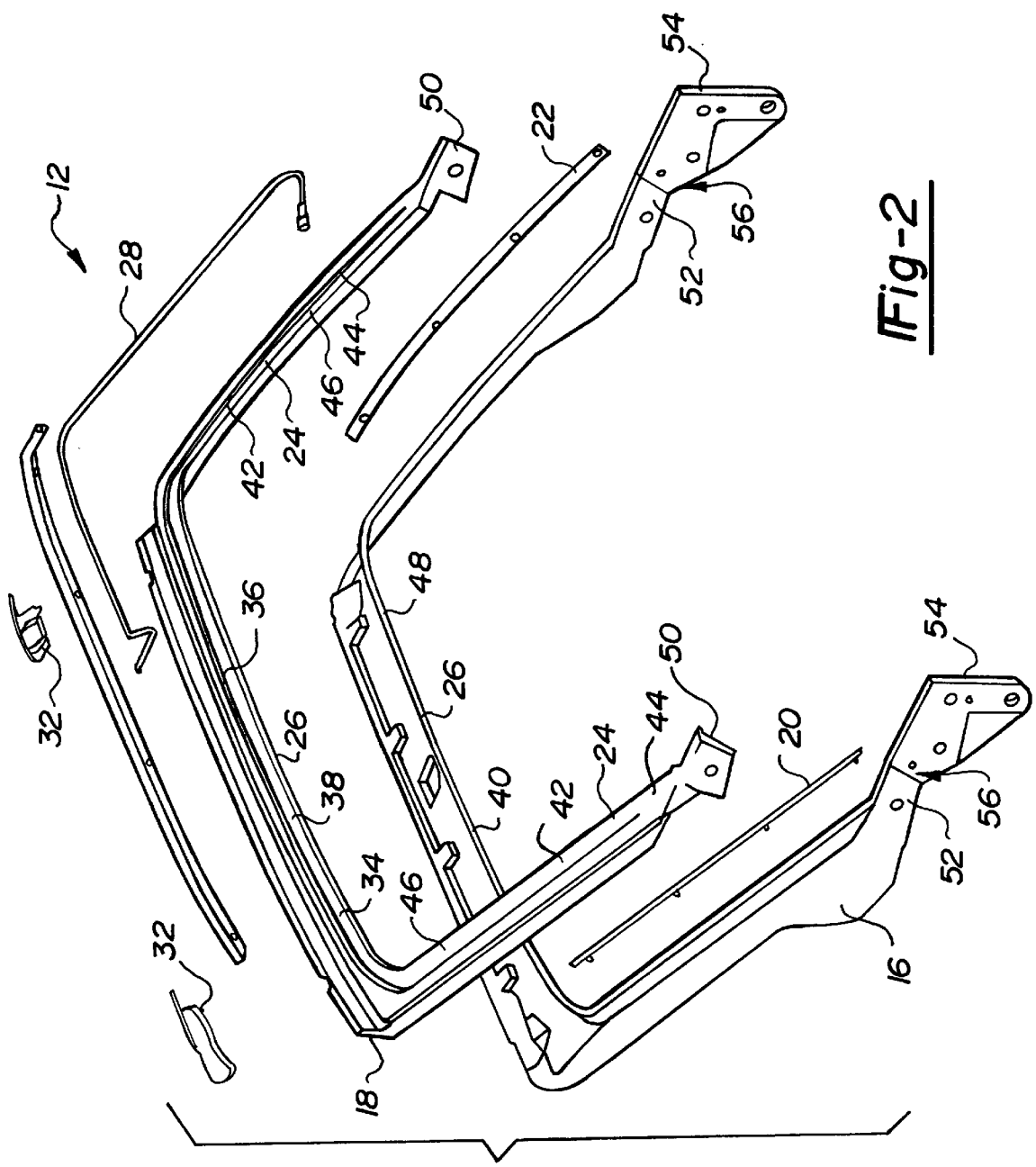

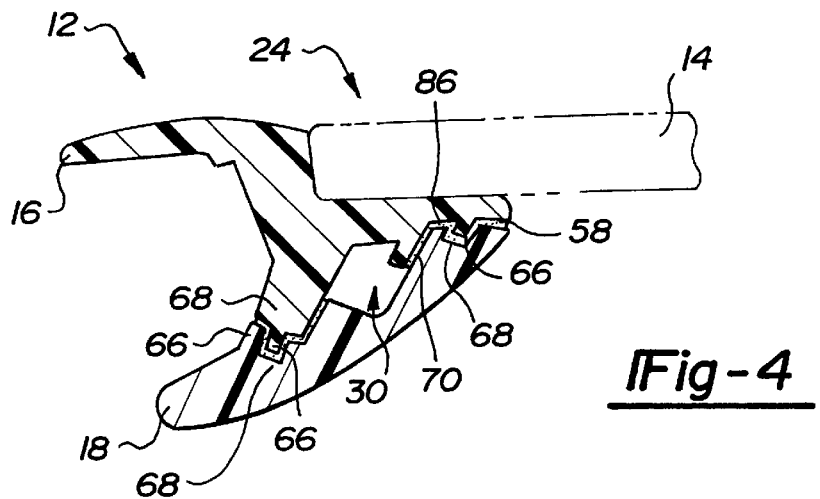
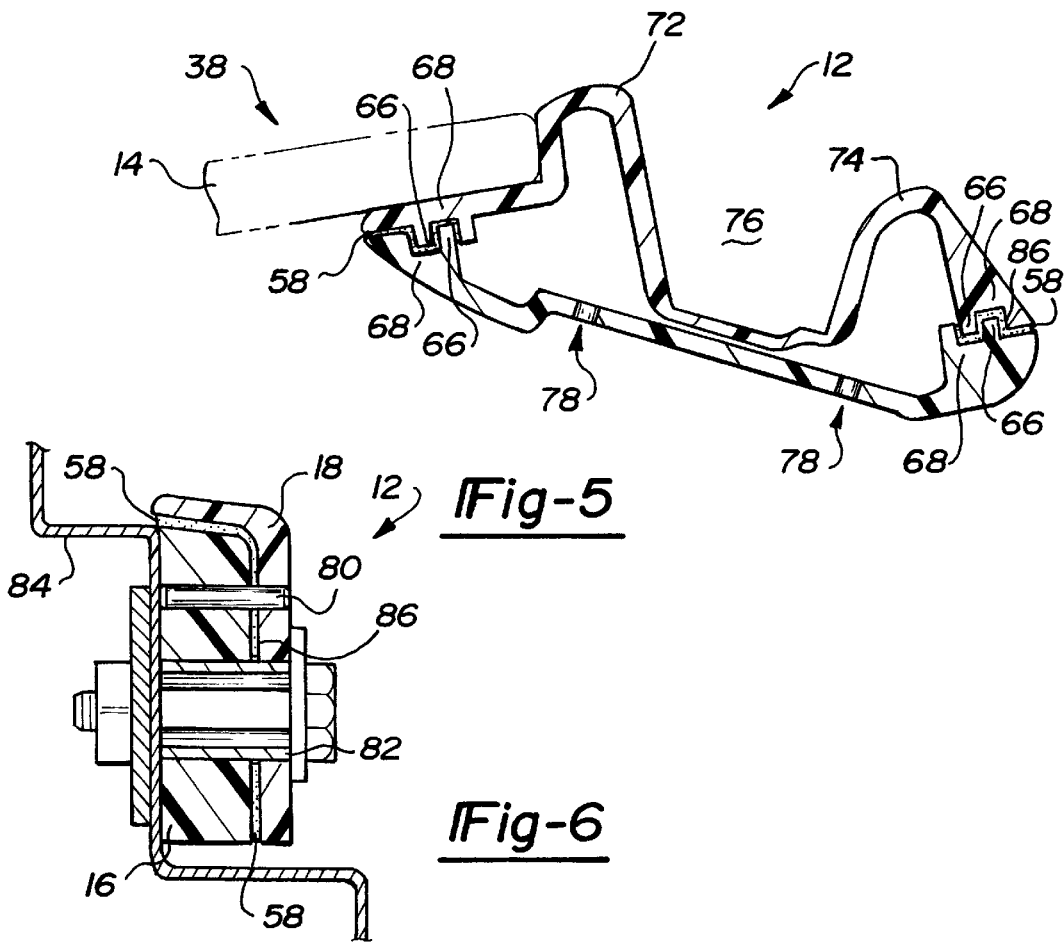

WINDSHIELD FRAME

BACKGROUND OF THE INVENTION

1. Technical Field

The present invention generally relates to windshield frames and more particularly to a windshield frame using a compression molded two piece construction.

2. Discussion

In the manufacture of convertible automobiles, it is necessary to provide a windshield framing structure as a separate component inasmuch as there is no hard roof and supporting pillar structure which can be used as the basis for defining the windshield framing structure. Windshield framing structure for convertible automobiles must be of high strength so that it may function as a stand-alone mechanism since the normal roofing and side pillar structure cannot be relied upon for structural integrity.

It is desirable to provide a windshield framing structure for a convertible vehicle which is rigid enough to support the windshield during vehicle operation as a stand-alone mechanism. This structure preferably includes an outward appearance which is cosmetically appealing to vehicle operators. A further desirable attribute is to provide such a framing structure which may be mounted on the vehicle as a single unit for ease of assembly at low cost and also which can be manufactured in an efficient manner and at low unit cost.

Conventional convertible car windshield frames often comprise more than ten (10) pieces of stamped steel. To obtain acceptable surface finishes typically requires additional trim pieces on both the interior and exterior surfaces. To achieve an acceptable surface appearance without additional trim pieces, composite technology for windshield frames has been explored (e.g., see U.S. Pat. No. 5,076,632). However, high quality parts from such previous composite techniques have been difficult to produce in a cost-effective manner.

Therefore, it is desirable to provide a windshield frame utilizing composite technology to solve the above-mentioned shortcomings of the prior art.

SUMMARY OF THE INVENTION

The present invention is directed toward providing a windshield frame utilizing composite technology. More particularly, the windshield frame preferably comprises a fiber reinforced plastic molded upper frame section bonded with a structural grade adhesive to a fiber reinforced plastic molded lower frame section. Additionally, steel reinforcements and tapping plates may be bonded to or molded into the frame sections to stabilize the structure and provide hardware attachment points. Continuous carbon fibers may also be molded in the frame sections in critical high stress areas. The strength of the bonding between the frame sections is enhanced by a tongue and groove geometry along the interface. In addition, dowel pins and bushings are used to mechanically tie the frame sections together near body side attachment points. The frame sections also define a hollow section therebetween designed to maximize structural efficiency, provide a conduit for electrical wires and offer a platform for visors, mirrors, seals, and other hardware.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 2 is an exploded view of the windshield framing structure of FIG. 1;

FIG. 4 is a cross-sectional view of the windshield framing structure taken along line 4—4 of FIG. 3;

FIG. 5 is a cross-sectional view of the windshield framing structure taken along line 5—5 of FIG. 3; and FIG. 6 is a cross-sectional view of the windshield framing structure taken along line 6—6 of FIG. 3.

DETAILED DESCRIPTION OF THE PREFERRED EMBODIMENTS

The following description of the preferred embodiments is merely exemplary in nature and is in no way intended to limit the present invention or its application or uses.

The present invention is particularly concerned with providing a windshield framing structure utilizing composite technology. Use of composite technology enables the manufacture of rigid frame structures with an acceptable surface finish without requiring additional trim pieces on both the interior and exterior surface. This, among other advantages, greatly reduces tooling costs. However, high-quality parts are difficult to produce in a cost-effective manner. The present invention overcomes this difficulty by preferably comprising a fiber reinforced plastic molded upper frame section bonded with a structural grade adhesive to a fiber reinforced plastic molded lower frame section.

Figure 1:
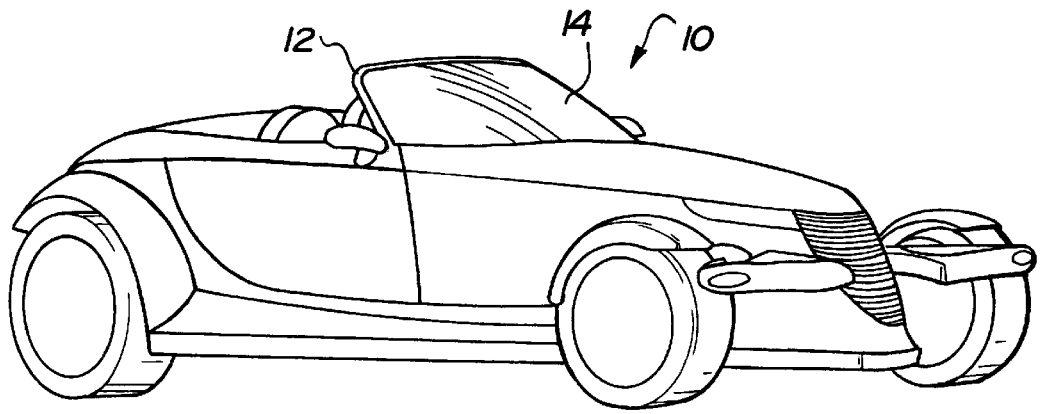
FIG. 1 is a perspective view of a convertible automobile including a windshield framing structure according to the present invention mounted therein.

Referring now to the drawings, a convertible automobile 10 is illustrated in FIG. 1. The windshield framing structure 12 of the present invention is mounted therein. Windshield glass 14 is mounted in the framing structure 12.

As shown in FIG. 2, the windshield framing structure 12 includes a lower frame section 16 which is bondable to an upper frame section 18. Preferably, the upper and lower frame sections 16, 18 are formed of fiber-reinforced plastic which is molded to the desired shape using compression molding. Even more preferably, the material used to form the frame sections 16, 18 is a glass fiber reinforced sheet molding compound (SMC) with an unsaturated polyester matrix. By way of nonlimiting example, frames sections 16 and 18 can be compression molded using the techniques disclosed in U.S. Pat. Nos. 4,612,149, 4,855,097, and 5,130,071, which are hereby incorporated by reference.

In addition, steel reinforcements 20 and tapping plates 22 are bonded on or molded into the upper and lower frame sections 16, 18 at critical areas such as the side windshield receiving portions 24 and the upper windshield receiving portion 26. Continuous carbon fibers may also be molded with the SMC in critical high stress areas. As such, the frame assembly 12 preferably provides support around the sides and top edge of the windshield 14. The windshield bottom or cowl edge is supported by the cowl stamping of the vehicle 10 to stabilize the structure and/or provide hardware attachment points.

Internal hardware, such as wiring harness 28, can be positioned between the frame sections 16, 18 prior to bonding. For this purpose, a conduit 30 (see FIGS. 4 and 5) is provided between the sections 16 and 18. Other components 32 may also be secured to the framing structure 12 as desired.

The upper frame section 18 includes an upper windshield receiving portion 26 having a base 34 and an up-turned edge 36 defining a mating surface 38. The lower frame section 16 includes an upper windshield receiving portion 26 including an upturned section 40 cooperating with the base 34 of the upper frame section 18 to provide support thereunder. The upper frame section 18 also has side window receiving portions 24 including a base 42 and an upwardly-turned edge 44 defining a mating surface 46. The lower frame section 16 includes an upwardly-extending flange 48 cooperating with the base 42 of the upper frame section 18 for supporting the windshield 14.

The upper frame section 18 terminates in an apertured mounting member 50 which cooperatively aligns with an apertured mounting member 52 of the lower frame section 16. The lower frame section 16 also includes a vehicle mounting structure 54 disposed at the ends 56 thereof permitting mounting of the framing structure 12 to the vehicle 10.

Figure 3:
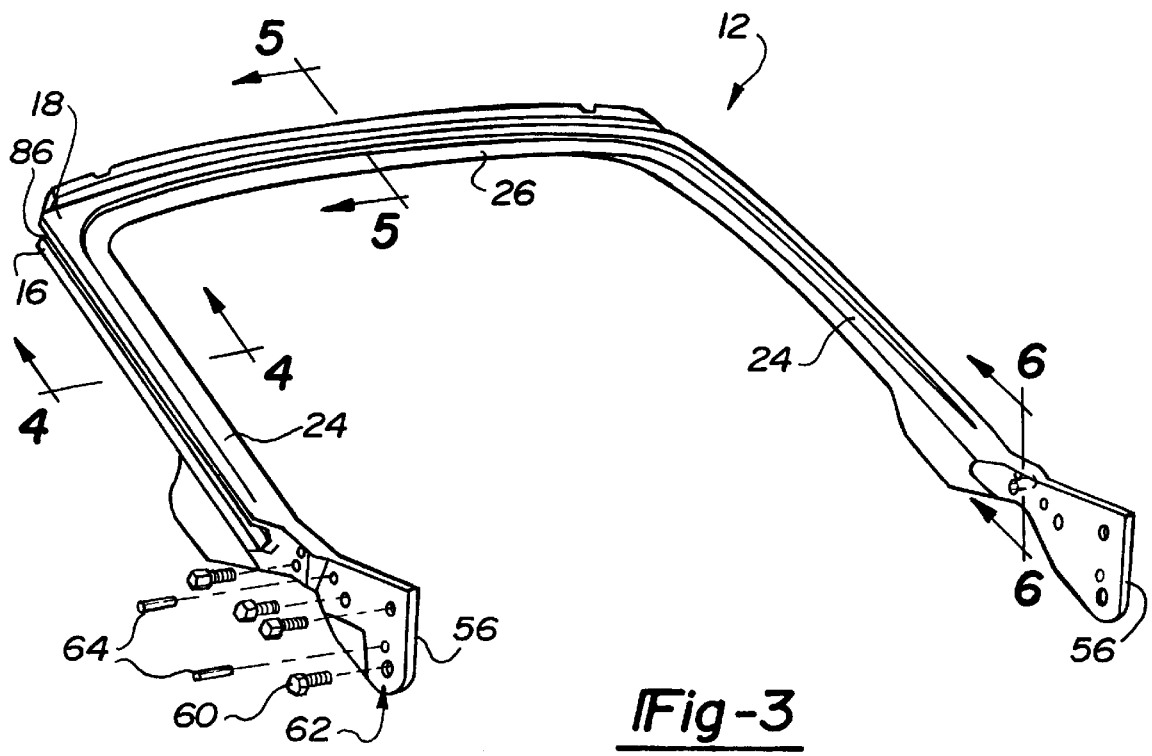
FIG. 3 is a perspective view of the windshield framing structure of FIG. 1.

As best seen in FIG. 3, the lower frame section 16 and the upper frame section 18 are bonded together to form a unified framing structure 12. Preferably, a structural grade two-part epoxy adhesive 58 (see FIGS. 4–6) is used for this purpose. The windshield framing structure 12 forms a generally U-shaped structure including the upper windshield receiving portion 26 and the side windshield receiving portions 24.

The windshield frame assembly 12 is attached to the vehicle 10 by a plurality of bolts 60 passing through corresponding bolt holes 62 in each side of the mounting structures 56 and by two shear pins 64 (per side). The bolts 60 serve as the primary means of attachment for the frame 12 while the shear pins 64 are used as additional support to maintain the attitude or angle of the frame assembly 12 relative to the vehicle 10.

Turning now to FIG. 4, the windshield framing structure 12 of the present invention is shown in cross-section along the line 4–4 of FIG. 3. As can be seen, the upper frame section 16 and the lower frame section 18 define a generally A-shaped side window receiving portion 24 including an internal channel 30. The inclusion of the channel 30 maximizes the structural efficiency, i.e., strength-to-weight ratio, of the frame 12. The channel 30 also provides a conduit for electrical wires 28 (FIG. 2) and offers a versatile platform for visors, mirrors, seals, and other hardware.

The strength of the bond between the frame sections 16, 18 is enhanced by a series of interconnecting projections 66 and recesses 68 formed along the bonding seam 70. This design spreads the force loads imposed on the adhesive 58. Preferably, a tongue and groove geometry is utilized for this purpose although other designs, such as dovetails or snap-lock features are suitable.

Turning now to FIG. 5, the frame structure 12 is shown in cross-section along line 5—5 of PIG. 3. The structure 12 in this area has a generally U-shaped configuration including the windshield mating surface 38 for supporting the windshield 14. The frame assembly 12 also includes first and second projections 72, 74 which aid in stabilizing the assembly 12 under load. The recess 76 between the projections 72, 74 enables location and mounting of weatherstripping seals. Mirror attachment points 78 are formed in the lower frame section 16 for supporting a vehicle rearview mirror (not shown).

Referring now to FIG. 6, the windshield framing structure 12 of the present invention is shown in cross-section along line 6—6 of FIG. 3. Dowel pins 80 and bushings 82 are used to mechanically tie the upper frame section 18 to the lower frame section 16 near the body side attachment points 84. In this way, the strength of the bond is enhanced and the frame may be conveniently mounted to the vehicle. The bushings 82 also give compressive strength to the bolt attachments to the body side 84.

Referring now collectively to FIGS. 2–6, to form the windshield framing structure 12 in accordance with the present invention, the upper frame section 18 and lower frame section 16 are initially formed by compression molding a fiber reinforced sheet molding compound to a desired form in a mold. This mold may include steel reinforcements 20 and tapping plates 22 as desired. Also, continuous carbon fibers may be molded with the SMC in high stress areas. Internal hardware, such as wires 28 and visor or mirror anchors, are then mounted to one of either the upper frame section 18 or the lower frame section 16 or both.

The upper frame section 18 and lower frame section 16 are then bonded together by preferably using a structural grade two-part epoxy adhesive 58 disposed along the interface 86 which includes a plurality of interconnecting tongues 66 and grooves 68. A plurality of bolt holes 62 are then formed through the frame assembly 12 for supporting mounting bolts 60 and shear pins 64. Additionally, dowel pins 80 and bushings 82 are incorporated to tie the frame sections 16, 18 together near the vehicle mounting structure 54. After the sections 16, 18 are bonded together, any visible adhesive seams are finished smooth and the structure 12 is painted in a lowbake process to provide a cosmetically appealing part for an operator. As such, a rigid structure 12 is provided for supporting the windshield 14 in a cosmetically appealing manner which requires no additional covering or trim.

From the foregoing, it can be appreciated that the windshield framing structure of the present invention provides a two piece fiber reinforced plastic molded construction to yield a rigid structure having a high-quality surface finish. As compared to prior art techniques, the windshield framing structure of the present invention is easy to produce in a cost effective manner. Furthermore, this highquality appearance is achievable without requiring additional trim pieces on either the interior or exterior surface.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A windshield frame comprising:

a U-shaped, single piece molded upper frame having an upper windshield receiving portion and side windshield receiving portions, said upper frame including at least two laterally spaced apart mating surfaces including a tongue and groove structure thereon; and a U-shaped, single piece molded lower frame having at least two laterally spaced apart mating surfaces including a tongue and groove structure thereon complimentary of said tongue and groove structure of said upper frame, said lower frame being bonded to said molded upper frame by interconnecting said tongue and groove structures and applying a layer of adhesive therebetween such that said upper and lower frames form a channel therebetween.

2. The windshield frame of claim 1 whwerin said upper frame and lower frame are made of compression molded fiber reinforced plastic.

3. The windshield frame of claim 1 further comprising internal hardware disposed within said channel.

4. The windshield frame of claim 2 wherein said upper frame and said lower frame include continuous carbon fibers.

5. The windshield frame of claim 1 wherein said upper frame and said lower frame include at least one of steel reinforcements and tapping plates.

6. A windshield frame comprising:
- a single piece compression molded plastic upper frame section having a first bonding surface and a second bonding surface spaced apart from said first bonding surface, said first and second bonding surfaces including a tongue and groove structure formed thereon;
- a single piece compression molded plastic lower frame section having a third bonding surface and a fourth bonding surface spaced apart from said third bonding surface, said third and fourth bonding surfaces including a tongue and groove structure formed thereon engaging said tongue and groove structure formed on said upper frame section such that said frame sections cooperate to form a U-shaped structure having an upper windshield receiving portion and side windshield receiving portions and a channel formed therethrough; and
- a mounting structure on said side windshield receiving portions for connecting said frame to a vehicle.

7. The windshield frame of claim 6 wherein said upper frame section is secured to said lower frame section with epoxy adhesive.

8. The windshield frame of claim 6 wherein said upper and lower frame sections include continuous carbon fibers.

9. The windshield frame of claim 6 wherein said upper and lower frame sections include at least one of steel reinforcements and tapping plates.

10. The windshield frame of claim 6 wherein a portion of said upper frame section bonded to a portion of said lower frame section located at ends thereof are secured together by shear pins.

11. The windshield frame of claim 6 wherein a portion of said upper frame section bonded to a portion of said lower frame section located at ends thereof are secured together by dowel pins and bushings.

12. The windshield frame of claim 6 wherein said upper and lower frame sections are mounted to said vehicle by a plurality of bolts passing through a plurality of holes formed in said mounting structure.

13. The windshield frame of claim 6 wherein said upper and said lower frames are made from sheet molding compound (SMC) including an unsaturated polyester matrix.

14. A windshield frame for a convertible automotive vehicle having a windshield, cowling, and side body panels said windshield frame comprising:
- a single piece upper frame member made of fiber-reinforced material bonded to a single piece lower frame member made of fiber-reinforced material, said frame members cooperating to form a generally U-shaped structure having an upper windshield receiving portion and side windshield receiving portions with ends of the side windshield receiving portions terminating where attachment to said side body panels occurs;
- the upper frame member and the upper windshield receiving portion having a base and an up-turned edge defining a mating surface, the lower frame member and the upper windshield receiving portion having an upturned flange supporting said base of said upper frame member;
- the upper frame member and the side windshield receiving portions having a base and an upturned edge defining a mating surface, the lower frame member and the side windshield receiving portions having an upturned flange supporting said base of said upper frame member; and
- the lower frame member terminating in end portions having a mounting structure for connecting said frame to said vehicle.

15. A method of making a windshield frame comprising:
- compression molding sheet molding compound into an upper frame having a first bonding surface and a second bonding surface spaced apart from said first bonding surface, said first and second bonding surfaces including a tongue and groove structure formed thereon;
- compression molding sheet molding compound into a lower frame having a third bonding surface and a fourth bonding surface spaced apart from said third bonding surface, said third and fourth bonding surfaces including a tongue and groove structure formed thereon; and
- bonding said lower frame to said upper frame by engaging said tongue and groove structure formed on said upper frame with said tongue and groove structure formed on said lower frame with a layer of adhesive such that said upper and lower frames cooperate to form a U-shaped structure having an upper windshield receiving portion and side windshield receiving portions and a channel formed therethrough.

16. The method of claim 15 wherein said bonding includes an epoxy adhesive.

17. The method of claim 15 further comprising: molding continuous carbon fibers into said upper and lower frames.

18. A frame comprising:
- a compression molded fiber reinforced plastic upper frame section having a first bonding surface and a cross-sectional configuration which varies along the length thereof;
- at least one tongue formed on said first bonding surface;
- a compression molded fiber reinforced plastic lower frame section having a second bonding surface and a cross-sectional configuration which varies along the length thereof;
- at least one groove formed in said second bonding surface engaging said tongue; and
- said upper frame section being bonded to the lower frame section with adhesive on the first and second bonding surfaces.

19. The frame of claim 18 wherein said upper frame section is secured to said lower frame section with epoxy adhesive.

20. The frame of claim 18 wherein said upper and lower frame sections include continuous carbon reinforcing fibers.

21. The frame of claim 18 wherein said upper and lower frame sections include at least one of steel reinforcements and tapping plates.

22. The frame of claim 18 wherein a portion of said upper frame section bonded to a portion of said lower frame section located at ends thereof are secured together by shear pins.

23. The frame of claim 18 wherein a portion of said upper frame section bonded to a portion of said lower frame section located at ends thereof are secured together by dowel pins and bushings.

24. The frame of claim 18 wherein said upper and lower frame sections are mounted to a vehicle by a plurality of bolts passing through a plurality of holes formed in said windshield frame.

25. The frame of claim 18 wherein said upper and said lower frames are made from sheet molding compound (SMC) including an unsaturated polyester matrix.

26. The frame of claim 18 wherein the upper and lower sections are generally U-shaped to define a windshield receiving structure for a convertible automobile.

27. A method of making a windshield frame comprising:

compression molding sheet molding compound into an upper frame having reinforcing fibers therein;

compression molding sheet molding compound into a lower frame having reinforcing fibers therein; and bonding said lower frame to said upper frame with an adhesive.

28. The method of claim 27 wherein said bonding includes an epoxy adhesive.

29. The method of claim 27 further comprising:

interconnecting a tongue and groove bonding surface of said upper frame with a tongue and groove bonding surface of said lower frame.

30. The method of claim 27 further comprising:

molding continuous carbon reinforcing fibers into said upper and lower frames.

* * * * *